J. E. LEAVITT.
TRACTION DEVICE.
APPLICATION FILED JUNE 11, 1918.

1,294,123.

Patented Feb. 11, 1919.

Inventor:
John E. Leavitt
by Robt. T. Harris,
Attorney

UNITED STATES PATENT OFFICE.

JOHN E. LEAVITT, OF BOSTON, MASSACHUSETTS.

TRACTION DEVICE.

1,294,123.

Specification of Letters Patent.   Patented Feb. 11, 1919.

Application filed June 11, 1918.   Serial No. 239,467.

*To all whom it may concern:*

Be it known that I, JOHN E. LEAVITT, a citizen of the United States, residing at Boston, county of Suffolk, and State of Massachusetts, have invented an Improvement in Traction Devices, of which the following description, in connection with the accompanying drawings, is a specification, like characters on the drawings representing like parts.

The invention to be hereinafter described relates to traction devices for wheels, and more particularly for wheels of the tractor type. The present invention is an improvement upon the one disclosed in my copending application, Serial No. 165,614, filed April 30, 1917.

The traction device shown, described and claimed in said application, is found to be a good, practical form for use under certain conditions, but I have found it desirable to provide means for more securely connecting the terminals of the device after it has been applied to the periphery of the rim of a wheel.

With this object in view, the character of the invention may be best understood by reference to the following description of one good form thereof shown in the accompanying drawings, wherein:—

Figure 1:
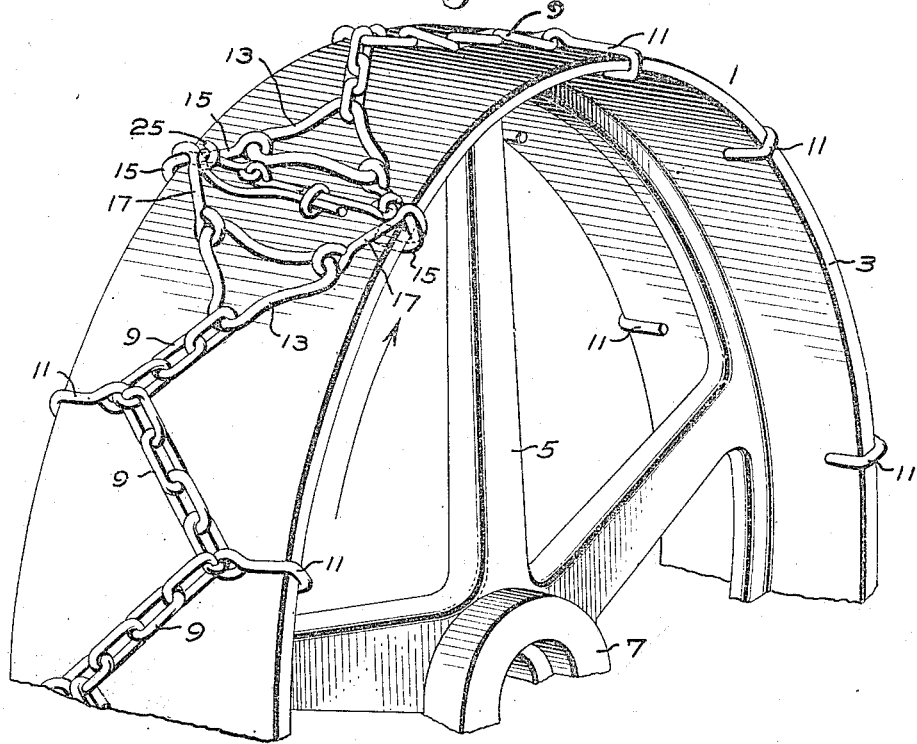
Figure 2:
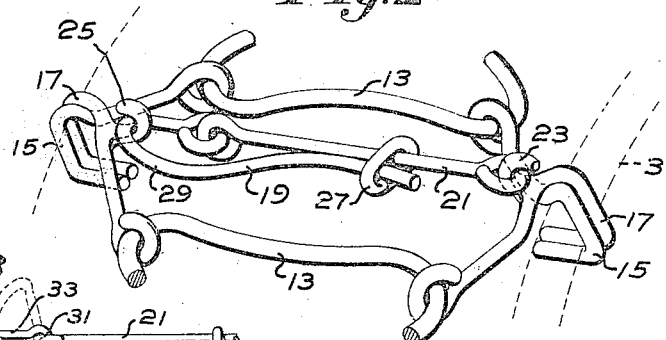
Figure 3:
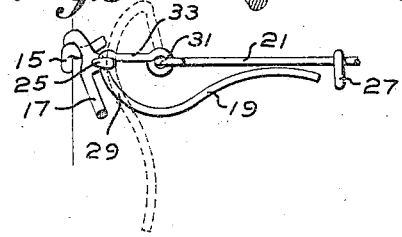

Figure 1 is a perspective view of a portion of a tractor wheel equipped with a traction device embodying the invention;

Fig. 2 on an enlarged scale is a perspective view of the means for securely connecting the terminals of the device together; and Fig. 3 is a detail to be referred to.

Referring to the drawing, 1 (Fig. 1) designates a portion of a tractor wheel having a wide rim 3 connected by spokes 5 with a hub 7.

The traction device, in the present instance of the invention comprises a series of transverse chains 9 or equivalent members preferably extending diagonally in a zigzag path along the tread surface of the rim of the wheel. Suitable means may be provided to connect or anchor the meeting ends of these transverse members with the edges of the rim of the wheel. This means, in the present instance of the invention, comprises a series of hooks 11 having eyes connected to the meeting ends of the transverse members, and hook ends extending around the edges of the rim and a substantial distance along the inner surface of the rim to allow more or less movement of the hooks relatively to the rim without liability of disconnection therefrom.

The terminal transverse members may be connected to terminal links 13 conveniently of triangular form with sides curved inward somewhat to locate the links connected thereto at the angles of the terminal links. A pair of hooks 15 may be connected to one of the terminal links, and a pair of hooks 17 may be connected to the other terminal link, the latter pair being formed to overlap the former pair in crossing relation therewith. When the device is placed under tension circumferentially of the wheel, the hooks will be drawn and maintained in close intimate relation and prevent separation of the terminal links of the device.

Under certain conditions there may be a tendency for the traction device to slacken somewhat and allow the pairs of hooks 15 and 17 to separate. If the device slackens sufficiently, the pair of links 17 may possibly escape from their positions in which they overlap the pair of hooks 15. The present invention provides simple and effective means to prevent any possibility of this occurrence. This means, in the present form of the invention comprises a swing hook 19 connected by a link 21 with a spur 23 projecting from one of the hooks 17. The eye of the hook is adapted to connect with a spur 25 of the opposite hook 17. A locking link 27 may be slidably mounted on the link 21 and receive the free end portion of the hook 19 to hold the same in its closed position.

Preferably the eye of the hook is formed to present a portion 29 having a radius from the center 31 somewhat shorter than the radius of the portion 33 from said center to cause the hook when under tension to automatically tend to slide with respect to the spur 25 until the hook seats itself adjacent the hook portion 33. When in this position, the pull through the hook 19 and the link 21 between the spurs 23 and 25 is in a direct line, and thus the hook tends automatically to remain in its closed position without relying on the locking link 27 to hold the same.

The construction described is such that the device may be quickly and easily applied to and removed from the rim of the wheel. To accomplish this, it is merely necessary to wrap the device about the rim of the wheel, place the hooks 11 over the edges of the rim of the wheel, place the terminal hook 17 in overlapping relation with respect to the terminal hooks 15, insert the hook 19 over the spur 25, and swing the same from its position shown in dotted lines to its position shown in full lines in Fig. 3. As stated, the shorter radius portion 29 of the hook will tend to slide the same to its final holding position and maintain the same in this position. Then the locking link may be slid along the link 21 over the free end of the hook, as will be noted in Figs. 1 and 2.

When it is desired to remove the device from the rim of the wheel, it is merely necessary to release the locking link 27, open the hook and withdraw the overlapping hooks 17 from the hooks 15. Then the device will fall from the rim of the wheel to the ground.

The facility with which the traction device may be applied to and removed from the wheel renders the same desirable for use on the wheels of tractors, since the device may be readily applied to the wheels when operating in the field, and the device may be readily removed from the wheels when they are to travel over roads.

The locking device described is simple and strong in construction, cheap to manufacture, and will reliably secure the terminals of the device together when the same is under tension on rotation of the wheel in both backward and forward directions.

It will be understood that the invention is not limited to the specific embodiment shown, but that various deviations may be made therefrom without departing from the spirit and scope of the appended claims.

What is claimed is:—

1. A traction device for wheels comprising a series of zig-zag members, hooks for connecting said members with opposed edges of the rim of the wheel, terminal links, pairs of hooks connected to said terminal links and adapted for connection with opposed edges of the rim of the wheel with one pair overlapping the other, and means to maintain said pairs of hooks in overlapped relation.

2. A traction device for wheels comprising a series of transverse members, means for connecting said members to the sides of the rim of the wheel, terminal hooks for overlapping relation, and means including a swinging hook movable to a position to secure said terminal hooks together, and movable to a position to release said terminal hooks.

3. A traction device for wheels comprising a series of transverse members, means for connecting said members with opposite sides of the rim of a wheel, pairs of terminal hooks for engagement with opposite sides of the rim of the wheel in overlapped relation, and means to maintain said terminal hooks in connected relation.

4. A traction device for wheels comprising a series of transverse members, means for connecting said members at intervals with opposed sides of a wheel, pairs of terminal hooks for connection with opposed sides of the rim of the wheel in overlapping relation, and means including a hook for connecting terminal hooks of the overlapping pair of hooks to secure the same in overlapping relation with the other pair of terminal hooks.

5. A traction device for wheels comprising a series of transverse members, means for connecting said members at intervals with opposed sides of a wheel, pairs of terminal hooks for overlapping relation, a link connected to one hook of the overlapping pair, and a swinging hook connected to said link for connection with the other hook of the overlapping pair.

6. A traction device for wheels comprising a series of transverse members, means for connecting said members at intervals with the rim of a wheel, terminal links, pairs of hooks connected to said terminal links and adapted for overlapping relation at opposed edges of the rim of the wheel, a link connected to a hook of one of said pairs, and a locking hook connected to said last-named link adapted for connection with the other hook of said pair, said locking hook having provision tending to maintain the same in active locking position.

7. A traction device for wheels comprising a series of transverse members, hooks connected to said members at intervals and adapted for engagement with opposed edges of the rim of the wheel, pairs of terminal hooks connected to the terminal members and adapted for overlapping interlocking relation with opposed edges of the rim of the wheel, a link connected to one of the hooks of the overlapping pair, and a locking hook connected to said last-named link and for connection with the other hook of the overlapping pair, said locking hook being formed with radii portions of different length to automatically tend to maintain the hook in active locking position.

In testimony whereof, I have signed my name to this specification.

JOHN E. LEAVITT.

Copies of this patent may be obtained for five cents each, by addressing the "Commissioner of Patents, Washington, D. C."